US011114839B2

(12) United States Patent
Howard et al.

(10) Patent No.: US 11,114,839 B2
(45) Date of Patent: Sep. 7, 2021

(54) SYSTEM AND METHOD FOR MITIGATING OVERVOLTAGE ON A DC LINK OF A POWER CONVERTER

(71) Applicant: General Electric Company, Schenectady, NY (US)

(72) Inventors: Dustin Howard, Atlanta, GA (US); Einar Vaughn Larsen, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 169 days.

(21) Appl. No.: 16/192,913

(22) Filed: Nov. 16, 2018

(65) Prior Publication Data

US 2020/0161999 A1    May 21, 2020

(51) Int. Cl.
| | | |
|---|---|---|
| *H02H 3/44* | (2006.01) |
| *H02H 7/12* | (2006.01) |
| *H02H 7/122* | (2006.01) |
| *F03D 17/00* | (2016.01) |
| *F03D 9/25* | (2016.01) |
| *H02K 7/18* | (2006.01) |
| *H02P 9/00* | (2006.01) |

(Continued)

(52) U.S. Cl.
CPC ............ *H02H 3/44* (2013.01); *H02H 7/1216* (2013.01); *H02H 7/1222* (2013.01); *F03D 9/255* (2017.02); *F03D 17/00* (2016.05); *F05B 2220/30* (2013.01); *F05B 2270/337* (2013.01); *H02K 7/183* (2013.01); *H02M 1/32* (2013.01); *H02M 5/4585* (2013.01); *H02P 9/006* (2013.01); *H02P 9/007* (2013.01)

(58) Field of Classification Search
CPC ...... H02H 3/44; H02H 7/1216; H02H 7/1222; H02M 1/32; H02M 5/4585
See application file for complete search history.

(56) References Cited

U.S. PATENT DOCUMENTS 9,581,139 B2 * 2/2017 Fortmann .................. F03D 9/28
2007/0121354 A1 * 5/2007 Jones ....................... H02P 9/102
363/47

(Continued)

FOREIGN PATENT DOCUMENTS

EP         2704309 A2    3/2014
KR       101673527 B1   11/2016

(Continued)

OTHER PUBLICATIONS

European Search Report, dated Feb. 19, 2020 for EP Application No. 19209212.0.

*Primary Examiner* — Rafael O De Leon Domenech
(74) *Attorney, Agent, or Firm* — Dority & Manning, P.A.

(57) ABSTRACT

A system and method for mitigating overvoltage on a DC link of a power converter of an electrical power system connected to a power grid includes receiving a voltage feedback signal from the DC link for a predetermined time period. The method also includes determining a rate of change of the voltage feedback signal during the predetermined time period. Further, the method includes predicting a future voltage value on the DC link as a function of the voltage feedback signal and the rate of change of the voltage feedback signal. Moreover, the method includes controlling the electrical power system based on the future voltage value.

15 Claims, 7 Drawing Sheets

(51) Int. Cl.
   *H02M 1/32*      (2007.01)
   *H02M 5/458*     (2006.01)

(56) References Cited

U.S. PATENT DOCUMENTS

| | | | | |
|---|---|---|---|---|
| 2014/0062424 A1* | 3/2014 | Larsen | ............... | H02P 9/10 |
| | | | | 322/24 |
| 2014/0320102 A1* | 10/2014 | Ali | ............... | H02M 3/157 |
| | | | | 323/284 |
| 2019/0219029 A1* | 7/2019 | Biris | ............... | F03D 7/0284 |
| 2019/0260300 A1* | 8/2019 | Horikoshi | ............... | H02M 7/48 |

FOREIGN PATENT DOCUMENTS

| | | |
|---|---|---|
| KR | 101769795 B1 | 9/2017 |
| WO | WO2017/190744 A1 | 11/2017 |

\* cited by examiner

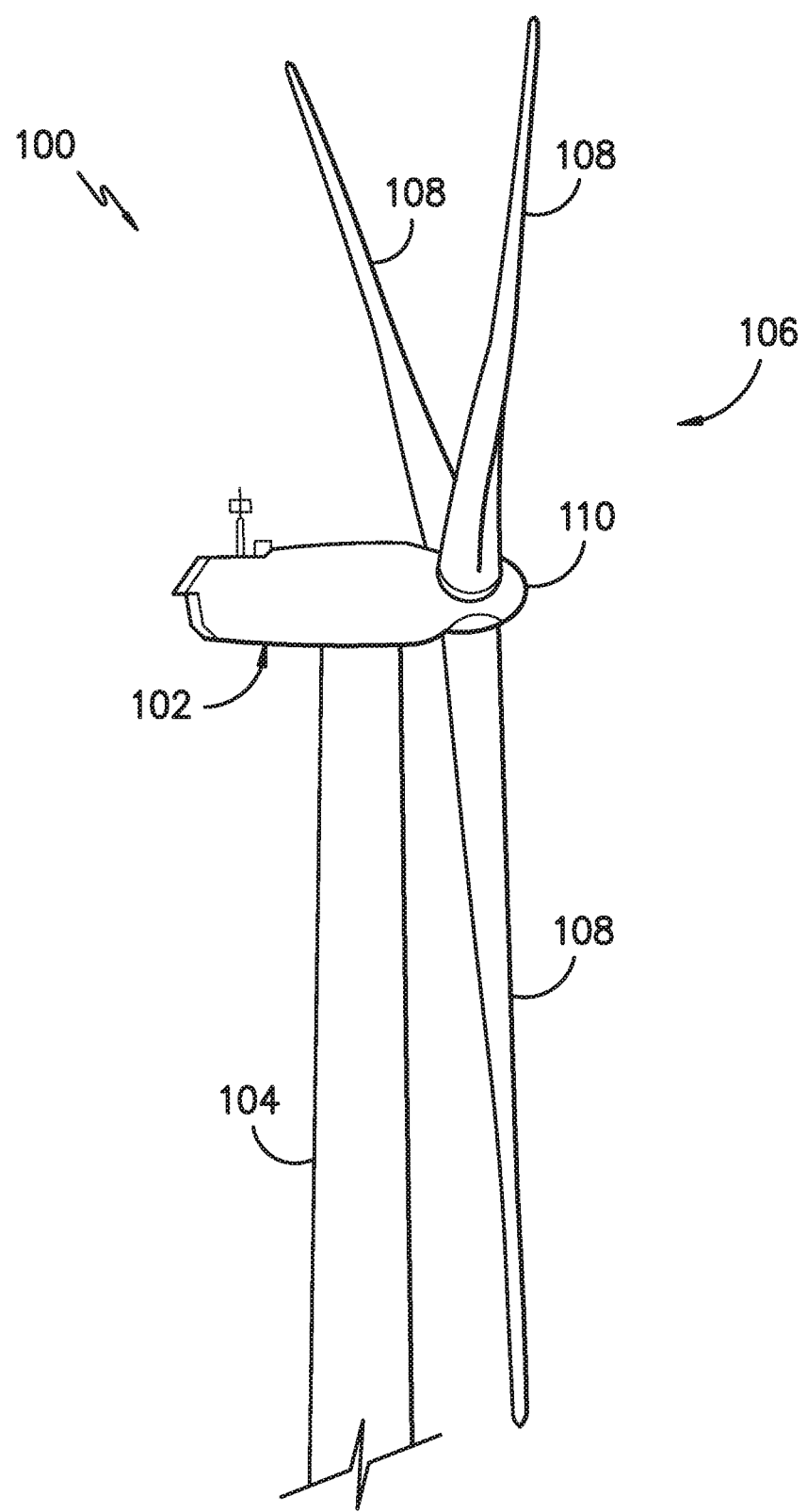
FIG. -1-

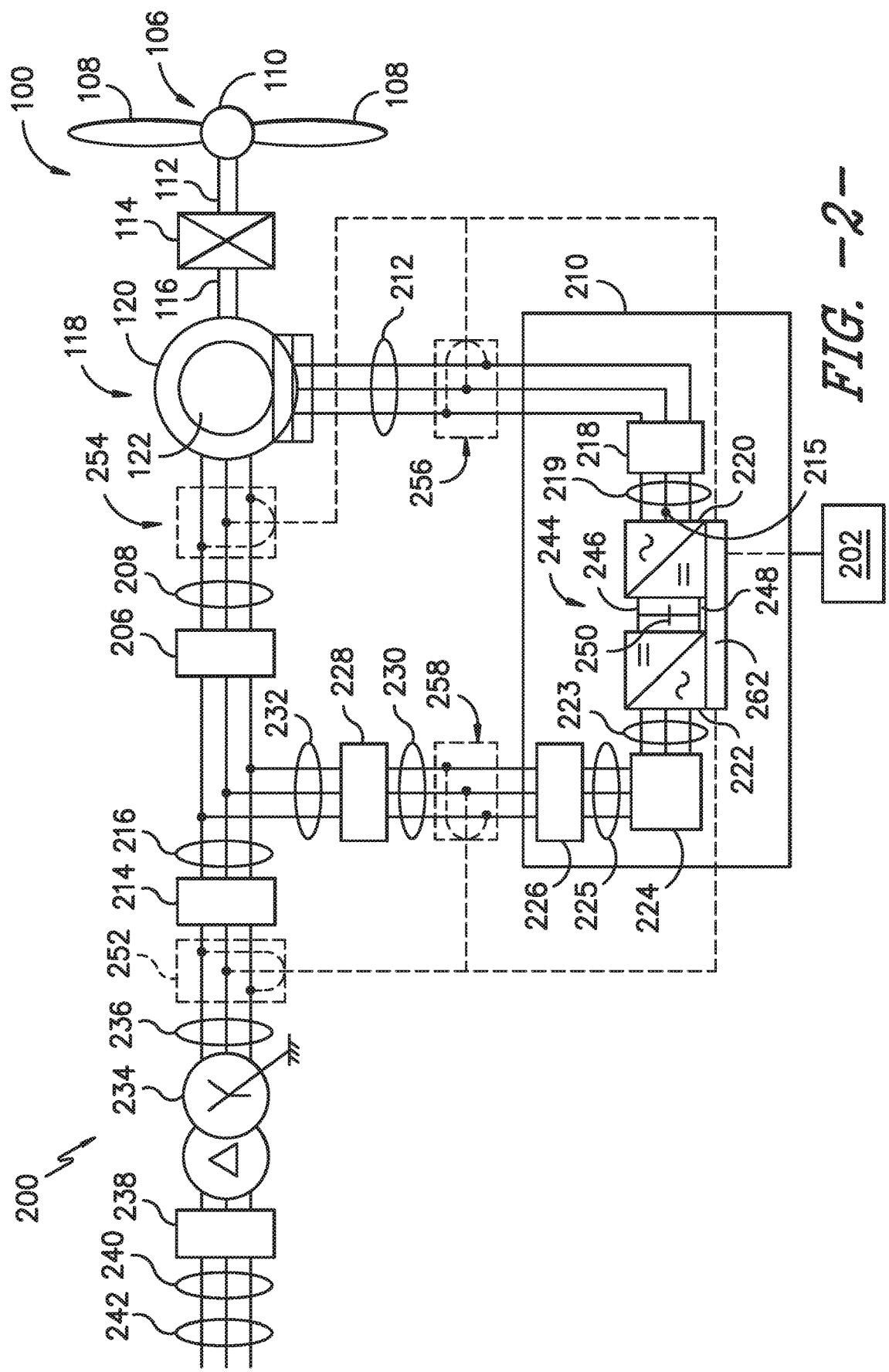
FIG. -2-

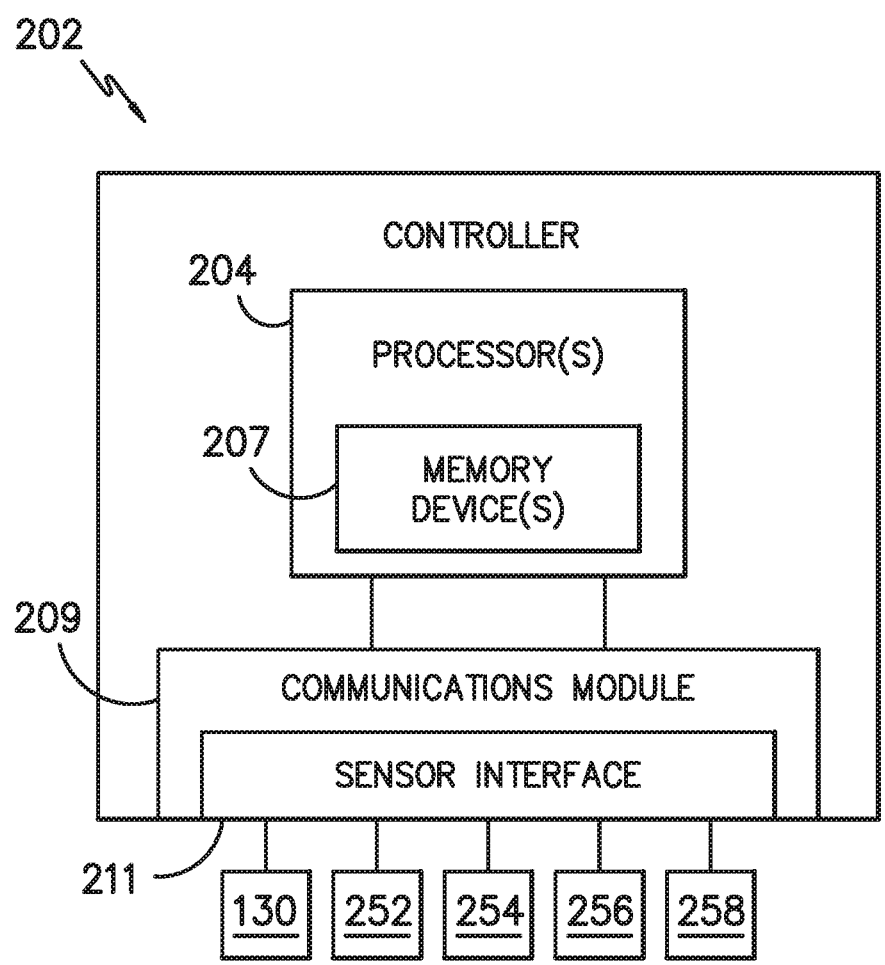
FIG. -3-

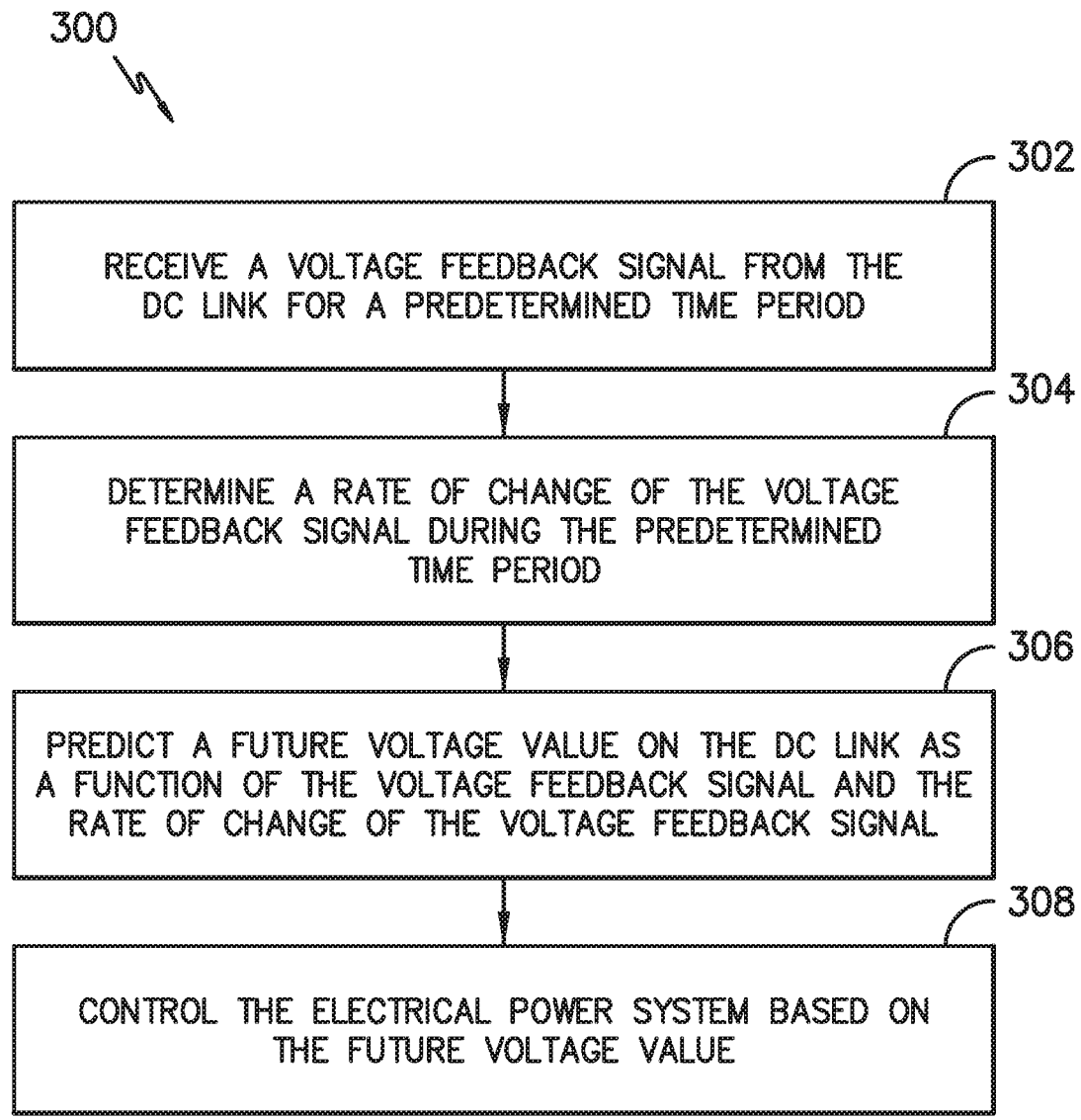
FIG. -4-

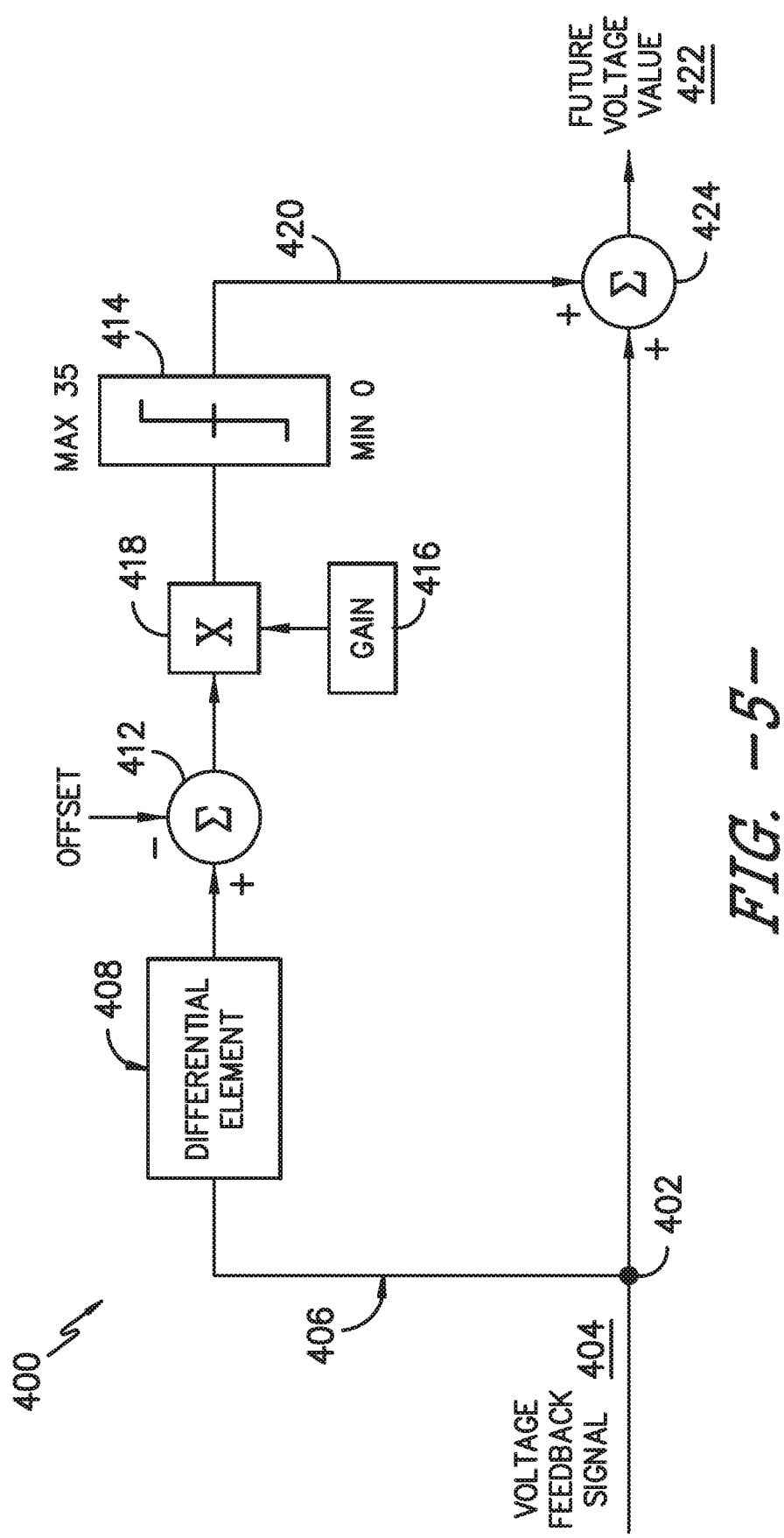
FIG. -5-

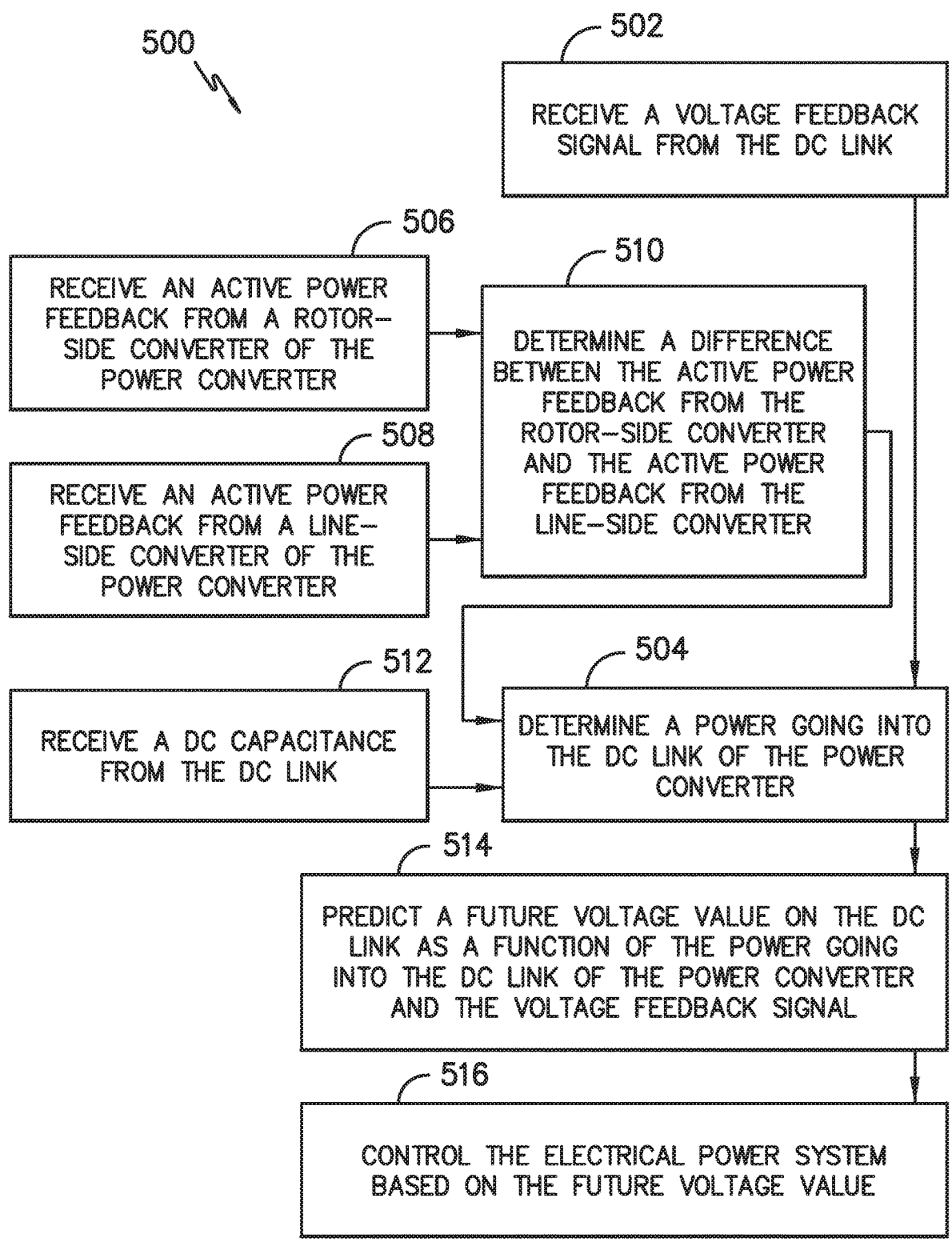
FIG. -6-

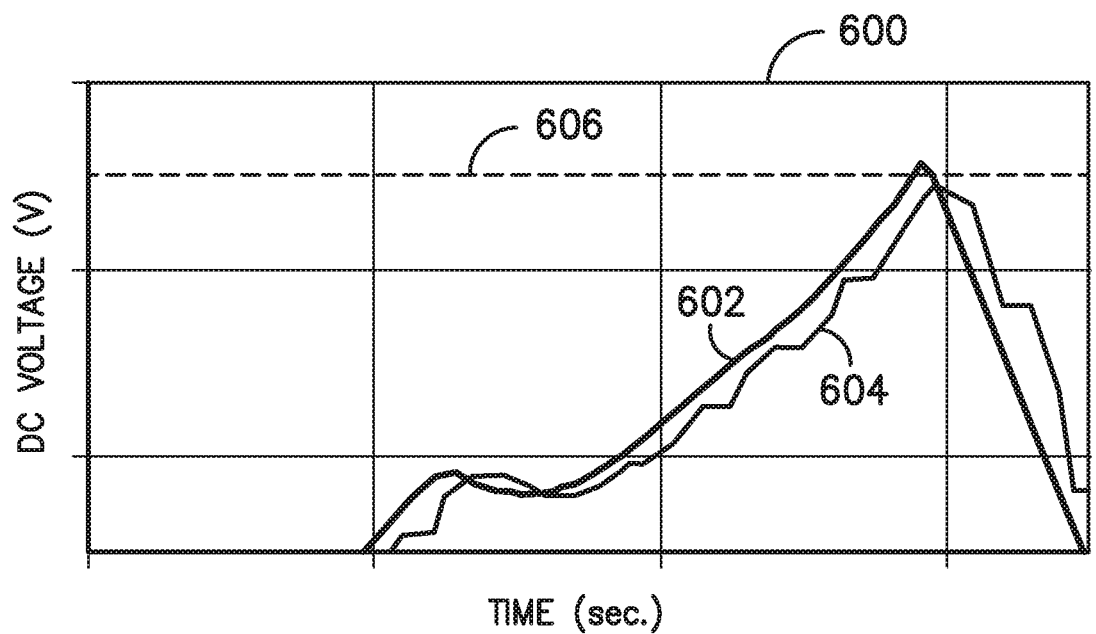
FIG. -7A-
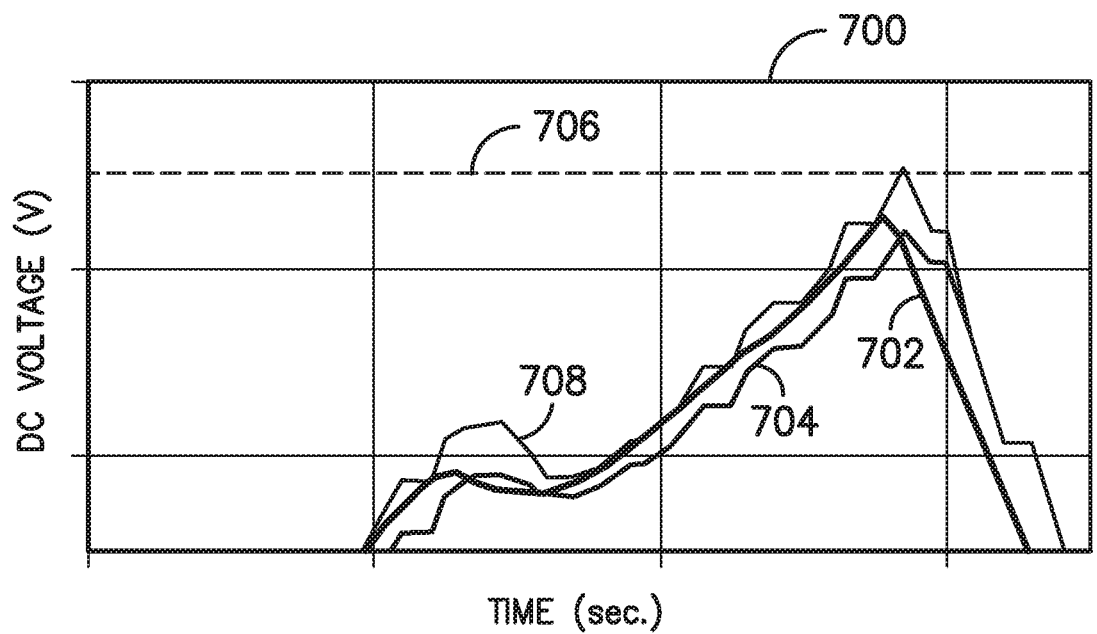
FIG. -7B-

SYSTEM AND METHOD FOR MITIGATING OVERVOLTAGE ON A DC LINK OF A POWER CONVERTER

FIELD

The present disclosure relates generally to wind turbines and, more particularly, to a system and method for predicting a future voltage value on a DC link of a power converter so as to mitigate an overvoltage condition, thereby preventing damage.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. For example, rotor blades typically have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to a generator for producing electricity.

During operation, wind impacts the rotor blades and the blades transform wind energy into a mechanical rotational torque that rotatably drives a low-speed shaft. The low-speed shaft is configured to drive the gearbox that subsequently steps up the low rotational speed of the low-speed shaft to drive a high-speed shaft at an increased rotational speed. The high-speed shaft is generally rotatably coupled to a generator so as to rotatably drive a generator rotor. As such, a rotating magnetic field may be induced by the generator rotor and a voltage may be induced within a generator stator that is magnetically coupled to the generator rotor. The associated electrical power can be transmitted to a main transformer that is typically connected to a power grid via a grid breaker. The main transformer steps up the voltage amplitude of the electrical power such that the transformed electrical power may be further transmitted to the power grid.

In many wind turbines, the generator rotor may be electrically coupled to a bi-directional power converter that includes a rotor-side converter joined to a line-side converter via a regulated DC link. More specifically, some wind turbines, such as wind-driven doubly-fed asynchronous generator (DFAG) systems, may include a power converter with an AC-DC-AC topology.

In such systems, various transients on the power grid can create high voltage on the DC link of the power converter. For conventional systems, certain control functions, including crowbar and software Instantaneous Over Current (IOC) protection, have been designed to mitigate the impact of these grid events to prevent damage to converter hardware. However, such control features have inherent time delays due to the finite task rates related feedback processing and converter control execution. Therefore, if the DC voltage increases at a fast-enough rate, the time delays can result in over voltages on the DC link since the mitigation or protection functions cannot operate fast enough.

In view of the aforementioned issues, the present disclosure is directed to a system and method that compensates for the inherent time delays in previous control schemes by estimating the voltage at a future point in time to ensure that a control action is implemented before the overvoltage occurs.

BRIEF DESCRIPTION

Aspects and advantages of the invention will be set forth in part in the following description, or may be obvious from the description, or may be learned through practice of the invention.

In one aspect, the present disclosure is directed to a method for mitigating overvoltage on a DC link of a power converter of an electrical power system connected to a power grid caused by transients on the power grid. The method includes receiving a voltage feedback signal from the DC link for a predetermined time period. The method also includes determining a rate of change of the voltage feedback signal during the predetermined time period. Further, the method includes predicting a future voltage value on the DC link as a function of the voltage feedback signal and the rate of change of the voltage feedback signal. Moreover, the method includes controlling the electrical power system based on the future voltage value.

In one embodiment, determining the rate of change of the voltage feedback signal during the predetermined time period may include processing, via a differential element, the voltage feedback signal. In such embodiments, the differential element may include a washout filter and a low-pass filter having a frequency range of about 500 radians/second (rad/s) to about 1500 rad/s, more preferably about 1000 rad/s. Thus, in such embodiments, the method may also include filtering the rate of change of the voltage feedback signal via the low pass filter so as to reduce noise.

In another embodiment, the method may also include restricting, via at least one of an offset or a limiter, the rate of change of the voltage feedback signal to positive changes of a certain magnitude. More specifically, in one embodiment, the method may include restricting the rate of change of the voltage feedback signal to positive changes of the certain magnitude via both the offset and the limiter. In other words, in such embodiments, the minimum limits of the limiter may be set to zero such that the rate of change of the voltage feedback signal is restricted to positive values.

In further embodiments, the method may further include applying a gain to the rate of change of the voltage feedback signal. In such embodiments, the method may also include tuning the gain so as to accurately predict the future voltage value on the DC link. More specifically, the gain may be greater than about 2, such as about 2.5. In other words, it should be understood that the higher the gain, the further in time the future voltage value will represent.

In additional embodiments, predicting the future voltage value on the DC link as the function of the voltage feedback signal and the rate of change of the voltage feedback signal may include summing the voltage feedback signal and the rate of change of the voltage feedback signal.

In yet another embodiment, controlling the electrical power system based on the future voltage value may include implementing a corrective action when the future value exceeds a predetermined threshold. In such embodiments, the corrective action may include turning on a crowbar circuit on a rotor-side converter of the power converter and/or shutting down the electrical power system.

In certain embodiments, the generator may be a doubly-fed asynchronous generator (DFAG). In addition, the electrical power system may be a wind turbine power system, a solar power system, an energy storage power system, or combinations thereof.

In another aspect, the present disclosure is directed to a method for mitigating overvoltage on a DC link of a power converter of an electrical power system connected to a power grid caused by transients on the power grid. The method includes receiving a voltage feedback signal from the DC link. The method also includes determining a power going into the DC link of the power converter. Further, the method includes predicting a future voltage value on the DC link as a function of the power going into the DC link of the power converter and the voltage feedback signal. Thus, the method includes controlling the electrical power system based on the future voltage value.

In such embodiments, determining the power going into the DC link of the power converter may include receiving an active power feedback from a rotor-side converter of the power converter, receiving an active power feedback from a line-side converter of the power converter, and determining a difference between the active power feedback from the rotor-side converter and the active power feedback from the line-side converter, the difference representing the power going into the DC link. Thus, the method may further include receiving a DC capacitance from the DC link and predicting the future voltage value on the DC link as a function of the difference between the active power feedback from the rotor-side converter and the active power feedback from the line-side converter, the voltage feedback signal, and the DC capacitance. It should be understood that the method may further include any of the additional steps and/or features as described herein.

In yet another aspect, the present disclosure is directed to a wind turbine power system connected to a power grid. The wind turbine power system includes a doubly-fed asynchronous generator (DFAG) having a rotor and a stator and a power converter. The power converter has a rotor-side converter electrically-coupled to a line-side converter via a DC link. The wind turbine power system also includes a controller communicatively coupled to the DFAG and the power converter. The controller is configured to perform one or more operations, including but not limited to receiving a voltage feedback signal from the DC link for a predetermined time period, determining a rate of change of the voltage feedback signal during the predetermined time period, predicting a future voltage value on the DC link as a function of the voltage feedback signal and the rate of change of the voltage feedback signal, and controlling the electrical power system based on the future voltage value. It should be understood that the wind turbine power system may further include any of the additional features as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of a portion of one embodiment of a wind turbine according to the present disclosure;

FIG. 2 illustrates a schematic view of one embodiment of an electrical and control system suitable for use with the wind turbine shown in FIG. 1;

FIG. 3 illustrates a block diagram of one embodiment of a controller suitable for use with the wind turbine shown in FIG. 1;

FIG. 4 illustrates a flow diagram of one embodiment of a method for mitigating overvoltage on a DC link of a power converter of an electrical power system connected to a power grid according to the present disclosure;

FIG. 5 illustrates a schematic diagram of one embodiment of a system for mitigating overvoltage on a DC link of a power converter of an electrical power system connected to a power grid according to the present disclosure;

FIG. 6 illustrates a flow diagram of another embodiment of a method for mitigating overvoltage on a DC link of a power converter of an electrical power system connected to a power grid according to the present disclosure;

FIG. 7A illustrates a graph of one embodiment of the voltage and the voltage feedback of the DC link without the protection methodology implemented according to the present disclosure; and FIG. 7B illustrates a graph of one embodiment of the voltage and the voltage feedback of the DC link with the protection methodology implemented according to the present disclosure.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the drawings, FIG. 1 illustrates a perspective view of a portion of an exemplary wind turbine 100 according to the present disclosure that is configured to implement the method and apparatus as described herein. The wind turbine 100 includes a nacelle 102 that typically houses a generator (not shown). The nacelle 102 is mounted on a tower 104 having any suitable height that facilitates operation of wind turbine 100 as described herein. The wind turbine 100 also includes a rotor 106 that includes three blades 108 attached to a rotating hub 110. Alternatively, the wind turbine 100 may include any number of blades 108 that facilitates operation of the wind turbine 100 as described herein.

Referring to FIG. 2, a schematic view of an exemplary electrical and control system 200 that may be used with the wind turbine 100 is illustrated. During operation, wind impacts the blades 108 and the blades 108 transform wind energy into a mechanical rotational torque that rotatably drives a low-speed shaft 112 via the hub 110. The low-speed shaft 112 is configured to drive a gearbox 114 that subsequently steps up the low rotational speed of the low-speed shaft 112 to drive a high-speed shaft 116 at an increased rotational speed. The high-speed shaft 116 is generally rotatably coupled to a generator 118 so as to rotatably drive a generator rotor 122. In one embodiment, the generator 118 may be a wound rotor, three-phase, double-fed asynchronous generator (DFAG) that includes a generator stator 120 magnetically coupled to a generator rotor 122. As such, a rotating magnetic field may be induced by the generator rotor 122 and a voltage may be induced within a generator stator 120 that is magnetically coupled to the generator rotor 122. In one embodiment, the generator 118 is configured to convert the rotational mechanical energy to a sinusoidal, three-phase alternating current (AC) electrical energy signal in the generator stator 120. The associated electrical power can be transmitted to a main transformer 234 via a stator bus 208, a stator synchronizing switch 206, a system bus 216, a main transformer circuit breaker 214, and a generator-side bus 236. The main transformer 234 steps up the voltage amplitude of the electrical power such that the transformed electrical power may be further transmitted to a grid via a grid circuit breaker 238, a breaker-side bus 240, and a grid bus 242.

In addition, the electrical and control system 200 may include a wind turbine controller 202 configured to control any of the components of the wind turbine 100 and/or implement the method steps as described herein. For example, as shown particularly in FIG. 3, the controller 202 may include one or more processor(s) 204 and associated memory device(s) 207 configured to perform a variety of computer-implemented functions (e.g., performing the methods, steps, calculations and the like and storing relevant data as disclosed herein). Additionally, the controller 202 may also include a communications module 209 to facilitate communications between the controller 202 and the various components of the wind turbine 100, e.g. any of the components of FIG. 2. Further, the communications module 209 may include a sensor interface 211 (e.g., one or more analog-to-digital converters) to permit signals transmitted from one or more sensors to be converted into signals that can be understood and processed by the processors 204. It should be appreciated that the sensors (e.g. sensors 252, 254, 256, 258) may be communicatively coupled to the communications module 209 using any suitable means. For example, as shown in FIG. 3, the sensors 252, 254, 256, 258 may be coupled to the sensor interface 211 via a wired connection. However, in other embodiments, the sensors 252, 254, 256, 258 may be coupled to the sensor interface 211 via a wireless connection, such as by using any suitable wireless communications protocol known in the art. As such, the processor 204 may be configured to receive one or more signals from the sensors.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor 204 is also configured to compute advanced control algorithms and communicate to a variety of Ethernet or serial-based protocols (Modbus, OPC, CAN, etc.). Additionally, the memory device(s) 207 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 207 may generally be configured to store suitable computer-readable instructions that, when implemented by the processor(s) 204, configure the controller 202 to perform the various functions as described herein.

Referring back to FIG. 2, the generator stator 120 may be electrically coupled to a stator synchronizing switch 206 via a stator bus 208. In one embodiment, to facilitate the DFAG configuration, the generator rotor 122 is electrically coupled to a bi-directional power conversion assembly 210 or power converter via a rotor bus 212. Alternatively, the generator rotor 122 may be electrically coupled to the rotor bus 212 via any other device that facilitates operation of electrical and control system 200 as described herein. In a further embodiment, the stator synchronizing switch 206 may be electrically coupled to a main transformer circuit breaker 214 via a system bus 216.

The power conversion assembly 210 may include a rotor filter 218 that is electrically coupled to the generator rotor 122 via the rotor bus 212. In addition, the rotor filter 218 may include a rotor-side reactor. A rotor filter bus 219 electrically couples the rotor filter 218 to a rotor-side power converter 220. Further, the rotor-side power converter 220 may be electrically coupled to a line-side power converter 222 via a single direct current (DC) link 244. Alternatively, the rotor-side power converter 220 and the line-side power converter 222 may be electrically coupled via individual and separate DC links. In addition, as shown, the DC link 244 may include a positive rail 246, a negative rail 248, and at least one capacitor 250 coupled therebetween. Further, as shown, the power converter 210 may also include at least one crowbar circuit 215 for preventing an overvoltage condition from occurring in the power converter, which will be explained in more detail herein. More specifically, as shown, at least one crowbar circuit 215 may be configured with the rotor-side converter 220 of the power converter 210.

In addition, a line-side power converter bus 223 may electrically couple the line-side power converter 222 to a line filter 224. Also, a line bus 225 may electrically couple the line filter 224 to a line contactor 226. In addition, the line filter 224 may include a line-side reactor. Moreover, the line contactor 226 may be electrically coupled to a conversion circuit breaker 228 via a conversion circuit breaker bus 230. In addition, the conversion circuit breaker 228 may be electrically coupled to the main transformer circuit breaker 214 via system bus 216 and a connection bus 232. The main transformer circuit breaker 214 may be electrically coupled to an electric power main transformer 234 via a generator-side bus 236. The main transformer 234 may be electrically coupled to a grid circuit breaker 238 via a breaker-side bus 240. The grid circuit breaker 238 may be connected to the electric power transmission and distribution grid via a grid bus 242.

In operation, alternating current (AC) power generated at the generator stator 120 by rotation of the rotor 106 is provided via a dual path to the grid bus 242. The dual paths are defined by the stator bus 208 and the rotor bus 212. On the rotor bus side 212, sinusoidal multi-phase (e.g. three-phase) AC power is provided to the power conversion assembly 210. The rotor-side power converter 220 converts the AC power provided from the rotor bus 212 into DC power and provides the DC power to the DC link 244. Switching elements (e.g. IGBTs) used in bridge circuits of the rotor side power converter 220 can be modulated to convert the AC power provided from the rotor bus 212 into DC power suitable for the DC link 244.

The line side converter 222 converts the DC power on the DC link 244 into AC output power suitable for the electrical grid bus 242. In particular, switching elements (e.g. IGBTs) used in bridge circuits of the line side power converter 222 can be modulated to convert the DC power on the DC link 244 into AC power on the line side bus 225. The AC power from the power conversion assembly 210 can be combined with the power from the stator 120 to provide multi-phase power (e.g. three-phase power) having a frequency maintained substantially at the frequency of the electrical grid bus 242 (e.g. 50 Hz/60 Hz). It should be understood that the rotor-side power converter 220 and the line-side power converter 222 may have any configuration using any switching devices that facilitate operation of electrical and control system 200 as described herein.

Further, the power conversion assembly 210 may be coupled in electronic data communication with the turbine controller 202 and/or a separate or integral converter controller 262 to control the operation of the rotor-side power converter 220 and the line-side power converter 222. For example, during operation, the controller 202 may be configured to receive one or more voltage and/or electric current measurement signals from the first set of voltage and electric current sensors 252. Thus, the controller 202 may be configured to monitor and control at least some of the operational variables associated with the wind turbine 100 via the sensors 252. In the illustrated embodiment, each of the sensors 252 may be electrically coupled to each one of the three phases of the power grid bus 242. Alternatively, the sensors 252 may be electrically coupled to any portion of electrical and control system 200 that facilitates operation of electrical and control system 200 as described herein. In addition to the sensors described above, the sensors may also include a second set of voltage and electric current sensors 254, a third set of voltage and electric current sensors 256, a fourth set of voltage and electric current sensors 258 (all shown in FIG. 2), and/or any other suitable sensors.

It should also be understood that any number or type of voltage and/or electric current sensors may be employed within the wind turbine 100 and at any location. For example, the sensors may be current transformers, shunt sensors, rogowski coils, Hall Effect current sensors, Micro Inertial Measurement Units (MIMUs), or similar, and/or any other suitable voltage or electric current sensors now known or later developed in the art.

Thus, the converter controller 262 is configured to receive one or more voltage and/or electric current feedback signals from the sensors 252, 254, 256, 258. More specifically, in certain embodiments, the current or voltage feedback signals may include at least one of line feedback signals, line-side converter feedback signals, rotor-side converter feedback signals, or stator feedback signals. For example, as shown in the illustrated embodiment, the converter controller 262 receives voltage and electric current measurement signals from the second set of voltage and electric current sensors 254 coupled in electronic data communication with stator bus 208. The converter controller 262 may also receive the third and fourth set of voltage and electric current measurement signals from the third and fourth set of voltage and electric current sensors 256, 258. In addition, the converter controller 262 may be configured with any of the features described herein in regards to the main controller 202. Further, the converter controller 262 may be separate from or integral with the main controller 202. As such, the converter controller 262 is configured to implement the various method steps as described herein and may be configured similar to the turbine controller 202.

Referring now to FIG. 4, a flow chart 300 of a method for mitigating overvoltage on a DC link of a power converter of an electrical power system connected to a power grid according to the present disclosure is illustrated. In general, the method 300 will be described herein with reference to the wind turbine power system 200 shown in FIGS. 1-3. However, it should be appreciated that the disclosed method 300 may be implemented with any other suitable power system having any other suitable configurations. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (302), the method 300 includes receiving a voltage feedback signal from the DC link 244 for a predetermined time period. As shown at (304), the method 300 includes determining a rate of change of the voltage feedback signal during the predetermined time period. As shown at (306), the method 300 includes predicting a future voltage value on the DC link as a function of the voltage feedback signal and the rate of change of the voltage feedback signal. As shown at (308), the method 300 includes controlling the electrical power system based on the future voltage value.

The method 300 of FIG. 4 can be better understood with reference to FIG. 5, which illustrates a corresponding system 400 for mitigating overvoltage on the DC link 244 of the power converter 210. As shown at 402, the system 400 receives the voltage feedback signal 404. Further, as shown via path 406, the system 400 may be configured to determine the rate of change 420 of the voltage feedback signal 404 by processing, e.g. via a differential element 408, the voltage feedback signal 404. In such embodiments, as shown, the differential element 408 may include a washout filter followed by a low-pass filter for determining the rate of change of the voltage feedback signal 404. In such embodiments, the low-pass filter may have any suitable frequency range, such as from about 500 radians/second (rad/s) to about 1500 rad/s, more preferably about 1000 rad/s.

Still referring to FIG. 5, the system 400 may further determine the rate of change 420 of the voltage feedback signal 404 by restricting the voltage feedback signal 404 to positive changes of a certain magnitude, e.g. via an offset 412 and/or a limiter 414. In such embodiments, the minimum limits of the offset and the limiter 414 may be set to zero such that the voltage feedback signal 404 is restricted to positive values.

In further embodiments, the system 400 may also determine the rate of change 420 of the voltage feedback signal 404 by applying a gain 416 to the voltage feedback signal 404, e.g. as shown at multiplier 418. In such embodiments, the system 400 may also be configured to tune the gain 416 so as to accurately predict the future voltage value 422 on the DC link 244. More specifically, the gain 416 may be greater than about 2, such as about 2.5. In other words, it should be understood that the higher the gain, the further in the future the future voltage value will be.

Referring still to FIG. 5, the system 400 can then predict the future voltage value 422 on the DC link 244 as the function of the voltage feedback signal 404 and the rate of change 420 of the voltage feedback signal 404. For example, as shown at 424, the system 400 is configured to sum the voltage feedback signal 404 and the rate of change 420 of the voltage feedback signal 404 as shown at 424.

After the system 400 has determined the future voltage value 422, the system can control the power system 200 based on the future voltage value. For example, in one embodiment, the system 400 may be configured to implement a corrective action when the future value exceeds a predetermined threshold. In such embodiments, the corrective action may include, for example, turning on the crowbar circuit 215 of the rotor-side converter 220 of the power converter 210.

Referring now to FIG. 6, a flow chart 500 of another embodiment of a method for mitigating overvoltage on a DC link of a power converter of an electrical power system connected to a power grid according to the present disclosure is illustrated. In general, the method 500 will be described herein with reference to the wind turbine power system 200 shown in FIGS. 1-3. However, it should be appreciated that the disclosed method 500 may be implemented with any other suitable power system having any other suitable configurations. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (502), the method 500 includes receiving a voltage feedback signal from the DC link 244. As shown at (504), the method 500 includes determining a power going into the DC link 244 of the power converter 210. For example, as shown at (506), (508), and (510), determining the power going into the DC link 244 may include receiving an active power feedback from the rotor-side converter 220 of the power converter 210, receiving an active power feedback from the line-side converter 222 of the power converter 210, and determining a difference between the active power feedback from the rotor-side converter 220 and the active power feedback from the line-side converter 222. In such embodiments, the difference represents the power going into the DC link 244. In addition, as shown at (512), the method 500 may also optionally include receiving a DC capacitance from the DC link 244.

Thus, still referring to FIG. 6, as shown at (514), the method 500 includes predicting a future voltage value 422 of the DC link 244 as a function of, at least, the power going into the DC link 244 and the voltage feedback signal 404. In another embodiment, the method 500 may include predicting the future voltage value 422 of the DC link 244 as a function of the difference between the active power feedback from the rotor-side converter 220 and the active power feedback from the line-side converter 222, the voltage feedback signal, and the DC capacitance. Thus, as shown at (516), the method 500 further includes controlling the electrical power system 200 based on the future voltage value 422. For example, as mentioned, the method 500 may include turning on the crowbar circuit 215 of the power converter 210 if the future voltage value exceeds a predetermined threshold.

Benefits of the present disclosure can be better understood in reference to FIGS. 7A and 7B. As shown, FIG. 7A illustrates a graph 600 of the voltage 602 and the voltage feedback 604 of the DC link 244 without the protection methodology of the present disclosure. In contrast, FIG. 7B illustrates a graph 700 of the voltage 702 and the voltage feedback 704 of the DC link 244 with the protection methodology of the present disclosure. Further, thresholds 606, 706 represent a damage threshold in each of the graphs 600, 700, respectively. Thus, as shown, the voltage 602 of graph 600 exceeds the damage threshold 606. In contrast, however, the voltage 702 of graph 700 remains below the damage threshold 706. In addition, FIG. 7B also illustrates the future voltage value 708 of the DC link 244 as calculated according to the present disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for mitigating overvoltage on a DC link of a power converter of an electrical power system connected to a power grid caused by transients on the power grid, the method comprising:
   receiving a voltage feedback signal from the DC link;
   determining a rate of change of the voltage feedback signal during the predetermined time period by processing the voltage feedback signal via a differential element, the differential element comprising a washout filter and a low-pass filter;
   predicting a future voltage value on the DC link by summing the voltage feedback signal and the rate of change of the voltage feedback signal; and,
   controlling the electrical power system based on the future voltage value.

2. The method of claim 1 wherein the low-pass filter comprises a frequency range of from about 500 radians/second (rad/s) to about 1500 rad/s.

3. The method of claim 1, further comprising restricting, via at least one of an offset or a limiter, the rate of change of the voltage feedback signal to positive changes of a certain magnitude.

4. The method of claim 3, further comprising restricting, via the offset and the limiter, the rate of change of the voltage feedback signal to positive changes of the certain magnitude.

5. The method of claim 1, further comprising applying a gain to the rate of change of the voltage feedback signal.

6. The method of claim 5, further comprising tuning the gain so as to accurately predict the future voltage value on the DC link, the gain being greater than about 2.

7. The method of claim 1, wherein controlling the electrical power system based on the future voltage value further comprises implementing a corrective action when the future value exceeds a predetermined threshold.

8. The method of claim 7, wherein the corrective action comprises at least one of turning on a crowbar circuit on a rotor-side converter of the power converter or shutting down the electrical power system.

9. The method of claim 1, wherein the generator comprises a doubly-fed asynchronous generator (DFAG).

10. The method of claim 1, wherein the electrical power system comprises at least one of a wind turbine power system, a solar power system, an energy storage power system, or combinations thereof.

11. A method for mitigating overvoltage on a DC link of a power converter of an electrical power system connected to a power grid caused by transients on the power grid, the method comprising:

receiving a voltage feedback signal from the DC link;

determining a power going into the DC link of the power converter;

receiving an active power feedback from a rotor-side converter of the power converter;

receiving an active power feedback from a line-side converter of the power converter;

determining a difference between the active power feedback from the rotor-side converter and the active power feedback from the line-side converter, the difference representing the power going into the DC link;

receiving a DC capacitance from the DC link;

predicting a future voltage value on the DC link as a function of the difference between the active power feedback from the rotor-side converter and the active power feedback from the line-side converter, the voltage feedback signal, and the DC capacitance; and, controlling the electrical power system based on the future voltage value.

12. A wind turbine power system connected to a power grid, the wind turbine power system comprising:

a doubly-fed asynchronous generator (DFAG) comprising a rotor and a stator, the DFAG connected to the power grid;

a power converter comprising a rotor-side converter electrically coupled to a line-side converter via a DC link; and, a controller communicatively coupled to the DFAG and the power converter, the controller configured to perform a plurality of operations, the plurality of operations comprising:

receiving a voltage feedback signal from the DC link for a predetermined time period;

determining a rate of change of the voltage feedback signal during the predetermined time period by processing the voltage feedback signal via a differential element, the differential element comprising a washout filter and a low-pass filter; and, predicting a future voltage value on the DC link by summing the voltage feedback signal and the rate of change of the voltage feedback signal; and, controlling the electrical power system based on the future voltage value.

13. The wind turbine power system of claim 12, wherein determining the rate of change of the voltage feedback signal during the predetermined time period further comprises processing, via a differential element, the voltage feedback signal.

14. The wind turbine power system of claim 12, wherein the one or more operations further comprise restricting, via at least one of an offset or a limiter, the rate of change of the voltage feedback signal to positive changes of a certain magnitude.

15. The wind turbine power system of claim 12, further comprising applying a gain to the rate of change of the voltage feedback signal.

* * * * *